Mar. 27, 1923.
G. M. ANDERSON
1,449,576
ECCENTRIC HOOK
Filed Feb. 16, 1920
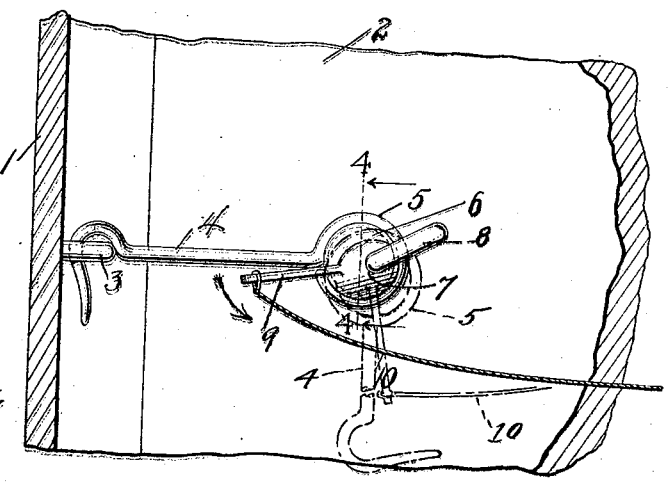
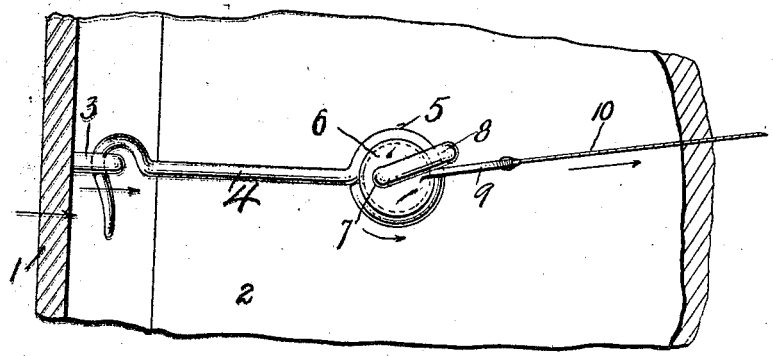
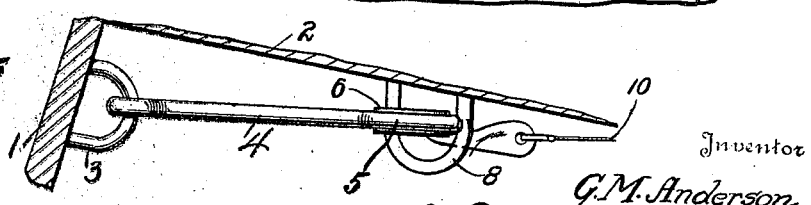
Inventor
G. M. Anderson
By Franklin H. Hough
Attorney Patented Mar. 27, 1923.

1,449,576

UNITED STATES PATENT OFFICE.

GEORGE M. ANDERSON, OF INWOOD, IOWA.

ECCENTRIC HOOK.

Application filed February 16, 1920. Serial No. 359,031.

*To all whom it may concern:*

Be it known that I, GEORGE M. ANDERSON, a citizen of the United States, residing at Inwood, in the county of Lyon and State of Iowa, have invented certain new and useful Improvements in Eccentric Hooks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide novel fastening means for a door, or the like, which will be simple in construction and which will be easily and quickly operated.

The invention is clearly disclosed in an exemplary form in the accompanying drawing, in which:

Figure 1 is a fragmentary view of a door and the adjacent wall of the compartment to which access is had through said door, my improvements being shown in side elevation, the parts being shown in the positions they assume before the hook is moved by the cam member in a direction to bind the same against the staple with which said hook is engaged and in dotted lines in depending unengaging position.

Figure 2 is a similar view showing the position of the parts after movement of said cam member.

Figure 3 is a horizontal sectional view through the door and wall.

Figure 4 is a sectional view on the line 4, 4 of Figure 1.

Referring now in detail to the drawing:

1 designates a door, of any suitable construction, and 2 one of the walls of a compartment to which access is had through said door. Carried by the door 1, which is hinged at one of its vertical sides, is a staple 3, with which is adapted to cooperate a hook 4, carrying at one end an eye 5.

Rotatable in said eye is a disk 6, provided eccentrically with an aperture 7, through which passes one leg of a staple 8, carried by the wall 2. Said leg of the staple, which projects through the opening in the disk 6 constitutes a pivot on which said disk 6 is rotatable. The disk is provided with a handle or finger piece 9, to which may be connected at its free end a flexible connection 10, by which the disk may be operated from a distance, or whereby, after movement of the disk, the end of the flexible member may be secured so as to prevent accidental movement of the disk in a direction to loosen the hook 4. The disk 6 constitutes a cam button, which, when the handle 9 is moved in the direction of the arrow in Figure 1, to the position shown in Figure 2, operates to move the hook 4 longitudinally in the direction of the arrows at the right hand side of Figure 2, so as to bind the hook against the staple 3, as shown in Figures 2 and 3. The hook is capable of swinging down to the position shown in dotted lines in Figure 1 or to any position about or upon the staple 8, the same as an ordinary hook attached by means of a staple, the eccentric being merely auxiliary to the hook and for the purpose of exerting stress after the device has been hooked.

What I claim to be new is:

The combination with a supporting staple and receiving loop spaced therefrom, of a hook having a circular eye surrounding one part of the staple and adapted to engage the loop, an eccentric mounted within the circular eye having a peripheral groove permitting the eccentric to rotate within the eye and with a perforation embracing the staple, and means rigidly connected with the eccentric for rotating the eccentric relative to the hook and the staple.

In testimony whereof I hereunto affix my signature.

GEORGE M. ANDERSON.